United States Patent
Horne et al.

(10) Patent No.: US 10,649,917 B2
(45) Date of Patent: May 12, 2020

(54) EFFICIENTLY STORING INTIALIZATION VECTORS

(71) Applicant: Hewlett Packard Enterprise Development LP, Houston, TX (US)

(72) Inventors: William G. Horne, Lawrenceville, NJ (US); Amro J. Awad, Princeton, NJ (US); Pratyusa K. Manadhata, Piscataway, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 242 days.

(21) Appl. No.: 15/577,698

(22) PCT Filed: Sep. 17, 2015

(86) PCT No.: PCT/US2015/050632
§ 371 (c)(1),
(2) Date: Nov. 28, 2017

(87) PCT Pub. No.: WO2017/048256
PCT Pub. Date: Mar. 23, 2017

(65) Prior Publication Data
US 2018/0165225 A1    Jun. 14, 2018

(51) Int. Cl.
*G06F 12/14* (2006.01)
*H04L 9/06* (2006.01)
(Continued)

(52) U.S. Cl.
CPC ...... *G06F 12/1408* (2013.01); *G06F 12/0875* (2013.01); *G06F 12/0895* (2013.01);
(Continued)

(58) Field of Classification Search
CPC .............. G06F 12/1408; G06F 12/0875; G06F 2212/1052; G06F 12/0895; G06F 21/64; H04L 9/08; H04L 9/065
See application file for complete search history.

(56) References Cited

U.S. PATENT DOCUMENTS 7,472,285 B2 * 12/2008 Graunke ............. G06F 12/1408
380/262
7,657,756 B2 * 2/2010 Hall ..................... G06F 12/0875
711/100
(Continued)

FOREIGN PATENT DOCUMENTS

EP         2889801 A1    7/2015
WO    WO-2014140957 A1    9/2014

OTHER PUBLICATIONS

Elbaz, R., et al.; "Tec-tree: a Low-cost, Parallelizable Tree for Efficient Defense Against Memory Replay Attacks"; Jun. 4, 2007; 15 pages.
(Continued)

*Primary Examiner* — J. Brant Murphy
(74) *Attorney, Agent, or Firm* — Hewlett Packard Enterprise Patent Department

(57) ABSTRACT

Examples relate to efficient storage of initialization vectors in a system. One example facilitates determining an initialization vector for use in encrypting a first cache line of a first page of memory, wherein determining the initialization vector comprises concatenating a page-level counter with a first set of hierarchical counters. The first set of hierarchical counters includes a first counter associated with the first cache line; a first group counter associated with a first group of cache lines, the first group of cache lines comprising the first cache line; and a first cluster counter associated with a first cluster of cache line groups, the first cluster comprising the first group of cache lines.

15 Claims, 2 Drawing Sheets

---

400 WRITE DATA TO A FIRST CACHE LINE OF A FIRST PAGE OF MEMORY

410 DETERMINE AN INITIALIZATION VECTOR FOR USE IN ENCRYPTING THE FIRST CACHE LINE BY CONCATENATING A PAGE-LEVEL COUNTER WITH A FIRST SET OF HEIRARCHICAL COUNTERS

420 ENCRYPT, USING THE DETERMINED INITIALIZATION VECTOR, THE FIRST CACHE LINE

(51) Int. Cl.
*G06F 12/0895* (2016.01)
*G06F 12/0875* (2016.01)
*H04L 9/08* (2006.01)

(52) U.S. Cl.
CPC .............. *H04L 9/065* (2013.01); *H04L 9/08* (2013.01); *G06F 2212/1052* (2013.01)

(56) References Cited

U.S. PATENT DOCUMENTS

| | | | | |
|---|---|---|---|---|
| 7,797,751 | B1* | 9/2010 | Hughes | G06F 21/64 726/26 |
| 8,473,754 | B2* | 6/2013 | Jones | G06F 21/72 380/277 |
| 8,732,480 | B2* | 5/2014 | Hashimoto | G06F 12/1425 713/189 |
| 9,092,644 | B2* | 7/2015 | Narendra Trivedi | H04L 9/0643 |
| 2005/0021986 | A1* | 1/2005 | Graunke | G06F 12/1408 713/193 |
| 2008/0044012 | A1* | 2/2008 | Ekberg | H04L 9/065 380/30 |
| 2014/0040618 | A1* | 2/2014 | Liu | H04L 9/0637 713/168 |
| 2014/0237261 | A1* | 8/2014 | Diep | G06F 12/1408 713/189 |
| 2014/0270163 | A1* | 9/2014 | Merchan | H04L 9/0637 380/46 |
| 2015/0215116 | A1* | 7/2015 | Gong | H04B 10/85 380/256 |
| 2016/0283748 | A1* | 9/2016 | Oh | G06F 21/78 |
| 2018/0349280 | A1* | 12/2018 | Prasad | G06F 12/0831 |

OTHER PUBLICATIONS

Chenyu et al: "Improving Cost, Performance, and Security of Memory Encryption and Authentication"; May 2006 (May 1, 2006), pp. 179-190.

Exploring high-performance and energy proportional interface for phase change memory systems, 2014 IEEE 20th International Symposium on High Performance Computer Architecture (HPCA), 0:210-221, 2013, 12 pages.

Huai et al., "Observation of Spin-Transfer Switching in Deep Submicron-Sized and LowResistance Magnetic Tunnel Junctions," Applied Physics Letters, vol. 84 (16), Apr. 13, 2004, 3 pages.

Jevdjic et al., "Die-Stacked DRAM Caches for Servers Hit Ratio, Latency, or Bandwidth? Have It All with Footprint Cache", In Proceedings of the 40th Annual International Symposium on Computer Architecture, ISCA'13, Jun. 23-27, 2013, pp. 1-12.

Qureshi et al., "Enhancing lifetime and security of pcm-based main memory with start-gap wear leveling", 42nd Annual IEEE/ACM International Symposium on Microarchitecture (MICRO-42 2009), Dec. 12-16, 2009, pp. 14-23.

Search Report and Written Opinion received for PCT Application No. PCT/US2015/050632, dated Oct. 26, 2016, 3 pages.

Yan et al, "Improving Cost, Performance, and Security of Memory Encryption and Authentication", Appears in the Proceedings of the 33rd International Symposium on Computer Architecture (ISCA-33), Jun. 2006, 12 pages.

Yang et al., "Memristive devices for computing", Nature nanotechnology, vol. 8, Jan. 2013, pp. 13-24.

Young et al., "DEUCE: Write-Efficient Encryption for Non-Volatile Memories," In Proceedings of the Twentieth International Conference on Architectural Support for Programming Languages and Operating Systems, ASPLOS'15, Mar. 14-18, 2015, 12 pages.

* cited by examiner

EFFICIENTLY STORING INTIALIZATION VECTORS

BACKGROUND

In secure processing systems, data must be secured from internal and external adversaries. Often, the data stored in a secure processing system is encrypted. Data may be encrypted by pre-generating encryption pads at the time that data is stored into the system. These pre-generated encryption pads may be generated based on an initialization vector and an encryption key.

BRIEF DESCRIPTION OF THE DRAWINGS

The following detailed description references the drawings, wherein.

DETAILED DESCRIPTION

Figure 1:
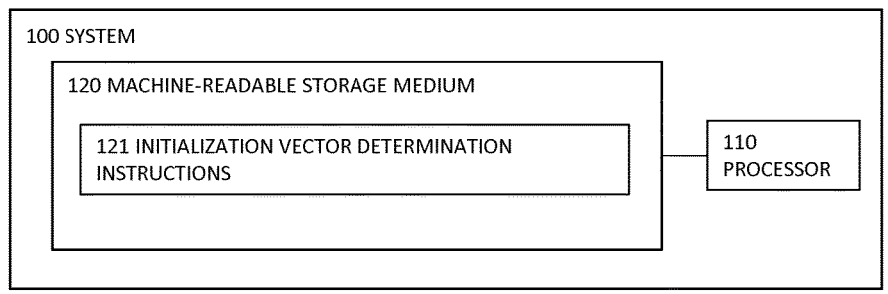
FIG. 1 is a block diagram of an example system for efficient storage of initialization vectors.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, in secure processing systems, data must be secured from internal and external adversaries. Often, the data stored in a secure processing system is encrypted. Data may be encrypted by pre-generating encryption pads at the time that data is stored into the system. These pre-generated encryption pads may be generated based on an initialization vector and an encryption key. These pre-generated encryption pads may be generated at a time that a cache line is being delivered. Once the cache line is delivered, a low latency operation (e.g., an XOR) is performed between the encryption pad and the data (e.g., as in AES-Ctr mode encryption) to generate the encrypted data. If the same initialization vector value was used with the same encryption key, the encryption scheme could be broken. As such, the same initialization vector value cannot be used again with the same encryption key.

To deal with this issue, secure processing systems implement the initialization vector partly as a counter and increment the initialization vector each time data is encrypted using the same encryption key. In particular, the initialization vector often comprises a 128 bit value, with 64 bits used for a cache line address and 64 bits used for the counter. As such, the term "incrementing the initialization vector" as used herein can be incrementing the counter portion of the initialization vector and the initialization vector value can be the value of the counter of the initialization vector. Similarly, determining an initialization vector can be determining the value of the counter of the initialization vector.

The incrementing of the initialization vector brings about its own set of technical challenges, Because a different initialization vector is used each time data is encrypted using the same encryption key, the latest initialization vector value needs to be stored in order to be able to decrypt the stored data. If each cache line stored its own initialization vector, each 64 byte cache line would incur a 12.5% storage overhead, causing storage and efficiency problems. These storage and efficiency problems are exacerbated due to the potential consequences of the initialization vector overflowing in the cache line. As such, a solution where each cache line stores its own initialization vector may be technically challenging to implement in memory systems at a large scale.

A new technical solution to this technical challenge involves efficient storage of initialization vectors. In particular, an example secure processing system efficiently stores initialization vectors for encrypting cache lines of data in a memory by using a set of hierarchical counters. Each cache line in the memory may be associated with a corresponding cache line counter. Each group of n cache lines may share a single group counter. Each set of m group counters may share a single cluster counter, and so forth, until a tree of p levels of cache lines is formed, where m, n and p are positive integers greater than or equal to 2. The root of the tree may be a page-level counter that is directly connected hierarchically to the top-most level of counters. An initialization vector for a particular cache line may then be determined by concatenating the set of counters associated with that cache line (e.g., the data of the first counter, the data of the first group counter, the data of the first cluster counter, and so forth).

Each time a cache line write occurs, the corresponding cache line counter will be incremented. If the cache line counter overflows, the group counter associated with the cache line counter will be incremented and all of the cache line counters associated with the group counter will be initialized. Responsive to the overflow, incrementing of the group counter, and initializing of the cache line counters, the data of the corresponding cache lines will be re-encrypted. Similarly, if the group counter overflows, the cluster counter will be incremented and all of the cache lines in that group will be encrypted again. This pattern will repeat until the top-most level counter is incremented to overflow, Responsive to the top-most level counter overflowing, the page counter will be incremented, and all cache lines in the page will be encrypted again.

An example computer system implementing efficient storage of initialization vectors may use 3 levels of counters in its hierarchy of counters (e.g., a cache line counter, a group counter associated with a first group of cache line counters, and a cluster counter associated with a set of group counters). In this example, the system may determine an initialization vector for use in encrypting a first cache line of a first page of memory. Determining the initialization vector may comprise concatenating a page-level counter with a first set of hierarchical counters associated with the first cache line. The first set of hierarchical counters may include, for example, a first counter associated with the first cache line, a first group counter associated with a first group of cache lines, where the first group of cache lines includes the first cache line, and a first cluster counter associated with a first cluster of cache line groups, where the first cluster includes the first group of cache lines. As discussed further below, the use of 3 levels in the hierarchy of counters is merely an example and is not limiting to the amount of levels that may be used.

Referring now to the drawings, FIG. 1 is a block diagram of an example system 100 for efficient storage of initialization vectors. In the example depicted in FIG. 1, system 100 includes a non-transitory machine-readable storage medium 120 and a processor 110.

Referring now to the drawings, FIG. 1 is a block diagram of an example system 100 for efficient storage of initialization vectors. System 100 may comprise a server, a mainframe, notebook, desktop, tablet, workstation, mobile device, a cloud-based device, and/or any other device suitable for executing the functionality described below. In the embodiment of FIG. 1, system 100 includes a non-transitory machine-readable storage medium 120 and a processor 110, Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, and/or other instructions to enable efficient storage of initialization vectors, as described below. As an alternative or in addition to retrieving and executing instructions, processor 110 may include one or more electronic circuits comprising a number of electronic components for performing the functionality of one or more of instructions 121, and/or other instructions.

In one example, the program instructions 121, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Non-transitory machine-readable storage medium 120 may be any hardware storage device for maintaining data accessible to system 100. For example, machine-readable storage medium 120 may include one or more hard disk drives, solid state drives, tape drives, memory fabrics, and/or any other storage devices. The storage devices may be located in system 100, may be located across disparate, geographically distributed devices, and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, universal memory, and the like. As described in detail below, machine-readable storage medium 120 may be encoded with executable instructions for efficient storage of initialization vectors. As detailed below, storage medium 120 may maintain and/or store the data and information described herein.

For example, storage medium 120 may maintain and/or store data and information related to efficient storage of initialization vectors. Storage medium 120 may store, for example, a set of hierarchical counters for each page of memory in the storage medium 120.

Initialization vector determination instructions 121, when executed by processor 110, may facilitate efficient storage of initialization vectors for use in encrypting cache lines of data. For each page of memory, the initialization vector determination instructions 121, when executed by processor 110, may determine an initialization vector for each cache line of that page of memory. Each page may be associated with a page-level counter and a cache tree used to store initialization vectors. The page-level counter and cache tree may be stored as part of the page, may be stored in the storage medium 120 along with an association (e.g., a pointer, link, etc.) to the page, and/or in another manner that is accessible by the processor 110. In some examples, the page-level counter may be part of the cache tree as well.

The initialization vector determination instructions 121, when executed by processor 110, may write and retrieve data to the page via a cache. For each cache line retrieved or stored in the cache, the initialization vector determination instructions 121, when executed by processor 110, may encrypt or decrypt the data as needed. As mentioned above, the initialization vector determination instructions 121, when executed by processor 110, may encrypt data using an encryption key (e.g., an encryption key of a user storing or retrieving the data from the page) and an initialization vector. As also mentioned above, each cache line is associated with its own initialization vector.

As data is written to and retrieved from the page via a cache, the initialization vector determination instructions 121, when executed by processor 110, may determine the appropriate initialization vector for the cache line being written to by using the page-level counter and cache tree. The cache tree may include at least three levels of hierarchical counters, including the page-level counter. The initialization vector determination instructions 121, when executed by processor 110, may determine the appropriate initialization vector by concatenating the counters at each level of the cache tree that are associated with the cache line to be encrypted (or decrypted).

In some examples as mentioned above, the counter portion of the initialization vector is 64 bits. Accordingly, the concatenated counters of the cache tree also have a size of 64 bits. In some examples, the page-level counter comprises a 8-bit value or 16 bit, resulting in the remainder of the counters in the cache tree having an aggregated value comprising the remainder number of bits. The size of the concatenated counters should equal or somehow formulaically correspond to the size of the counter portion of the initialization vector.

Figure 2:
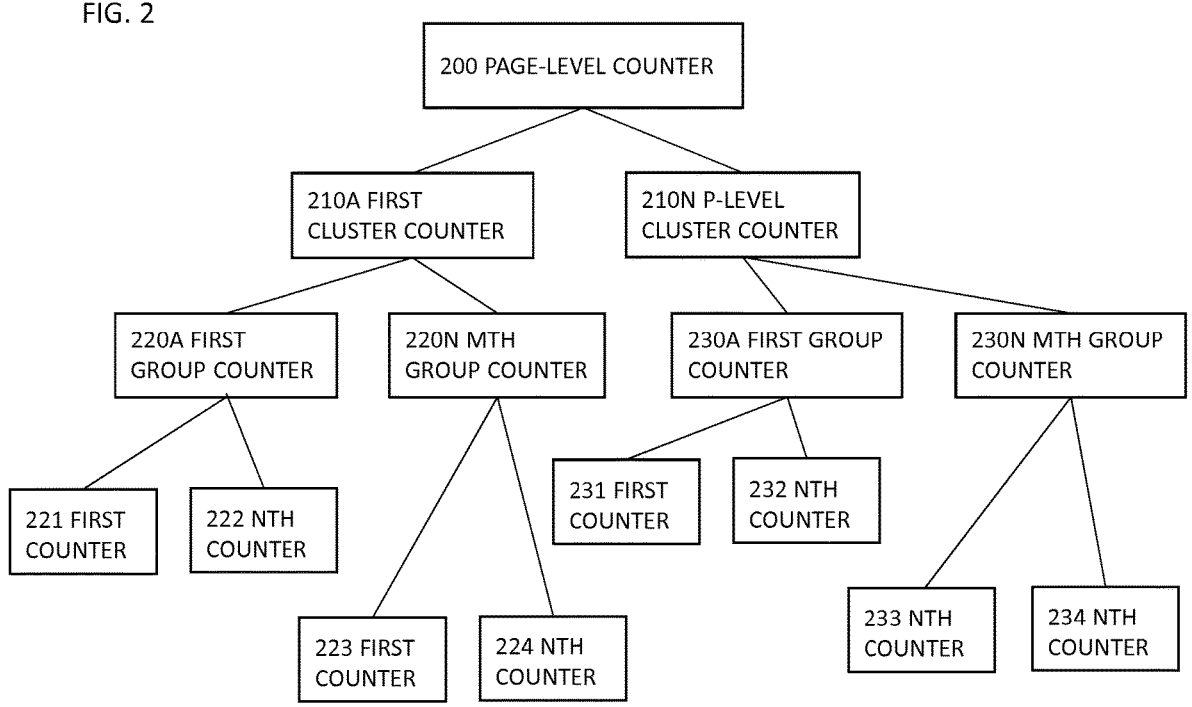
FIG. 2 is an example depiction of a cache tree for storing initialization vectors for efficient storage of initialization vectors.

An example of a cache tree is depicted in FIG. 2. As shown in FIG. 2, each cache line has its own counter (e.g., first counter 221), A set of counters (e.g., first counter 221, . . . , nth counter 222) associated with respective cache lines may be grouped under a first group counter 220A. Each set of group counters (e.g., 220A, . . . , 220M) may be grouped under a first cluster counter 210A. To determine an initialization vector for a cache line associated with the first counter 221, the initialization vector determination instructions 121, when executed by processor 110, may concatenate the page-level counter 200, the first cluster counter 210A, the first group counter 220A, and the first counter 221. Similarly, to determine an initialization vector for a cache line associated with nth counter 234, the initialization vector determination instructions 121, when executed by processor 110, may concatenate the page-level counter 200 with the p-level cluster counter 210N, the mth group counter 230N, and the nth counter 234.

The number of levels in the cache tree and the amount of nodes at each level are not limited to the examples depicted in FIG. 2. More than 3 levels of counters may be available in the cache tree, and the number of nodes at each level may differ among levels. In some examples, the size of the initialization vector, size of the page-level counter, number of levels of a cache tree, and/or number of nodes at each level of the cache tree for a page may depend upon a type of data, application, user, and/or other characteristic associated with the data being stored in that page.

An example computer system implementing efficient storage of initialization vectors may use 3 levels of counters in its hierarchy of counters (e.g., a cache-level counter, a group counter associated with a first group of cache lines, and a cluster counter associated with a set of grouped cache lines). In this example, the initialization vector determination instructions 121, when executed by processor 110, may determine an initialization vector for use in encrypting a first cache line of a first page of memory. The initialization vector determination instructions 121, when executed by processor 110, may determine the initialization vector by concatenating a page-level counter with a first set of hierarchical counters associated with the first cache line. The first set of hierarchical counters may include, for example, a first counter associated with the first cache line, a first group counter associated with a first group of cache lines, where the first group of cache lines includes the first cache line, and a first cluster counter associated with a first cluster of cache line groups, where the first cluster includes the first group of cache lines. In some examples, the first set of hierarchical counters may include a counter associated with the first cache line at each level of hierarchical counters. For example, using the cache tree of FIG. 2, initialization vector determination instructions 121, when executed by processor 110, may concatenate page-level counter 200, first cluster counter 210A, first group counter 220A, and first counter 221 to determine the initialization vector to use in encrypting the first cache line.

The initialization vector determination instructions 121, when executed by processor 110, may also manage the cache tree and initialization vectors used for encrypting and decrypting data stored in the page. For example, the initialization vector determination instructions 121, when executed by processor 110, may manage the process by which a counter in the cache tree overflows.

An example using the cache tree of FIG. 2 follows. Responsive to new data being written to the first cache line (associated with first counter 221), the initialization vector determination instructions 121, when executed by processor 110, may increment the first counter 221. Responsive to incrementing the first counter 221, the initialization vector determination instructions 121, when executed by processor 110, may update the initialization vector to include the incremented first counter 221 and encrypt the first cache line using the updated initialization vector. The initialization vector determination instructions 121, when executed by processor 110, may then cause the encrypted data of the first cache line to be written to the storage medium 120.

In some examples, responsive to the first counter 221 being incremented, the first counter 221 may overflow. Responsive to the first counter 221 overflowing, the initialization vector determination instructions 121, when executed by processor 110, may cause the first group counter 220A to be incremented. The initialization vector determination instructions 121, when executed by processor 110, may initialize the first set of counters 221, . . . , 222 responsive to the first group counter 220A being incremented. The initialization vector determination instructions 121, when executed by processor 110, may initialize the first set of counters 221, . . . , 222 by zeroing out the first set of counters, and/or otherwise initializing the first set of counters 221, . . . , 222. Responsive to the first set of counters 221, 222 being initialized, the initialization vector determination instructions 121, when executed by processor 110, may re-encrypt the data of the cache lines associated with the first set of counters 221, . . . , 222.

In some examples, responsive to the first group counter 220A being incremented, the first group counter 220A may overflow. Responsive to the first group counter 220A overflowing, the initialization vector determination instructions 121, when executed by processor 110, may cause the first cluster counter 210A to be incremented. The initialization vector determination instructions 121, when executed by processor 110, may initialize the first set of group counters 220A, . . . , 220N responsive to the first cluster counter 210A being incremented. The initialization vector determination instructions 121, when executed by processor 110, may initialize the first set of group counters 220A, . . . , 220N by zeroing out the first set of group counters 220A, 220N, and/or otherwise initializing the first set of group counters 220A, . . . , 220N. Responsive to the first set of group counters 220A, . . . , 220N being initialized, the initialization vector determination instructions 121, when executed by processor 110, may initialize each set of counters 221, . . . , 222, . . . 223, . . . , 224 associated with each group counter in the first set of group counters 220A, . . . , 220N. The initialization vector determination instructions 121, when executed by processor 110, may then re-encrypt the data of the cache lines associated with the initialized counters 221, . . . , 222, . . . , 223, . . . , 224.

In some examples, responsive to the first cluster counter 210A being incremented, the first cluster counter 210A may overflow. Responsive to the first cluster counter 210A overflowing, the initialization vector determination instructions 121, when executed by processor 110, may increment the page-level counter. Responsive to the page-level counter being incremented, the initialization vector determination instructions 121, when executed by processor 110, may initialize each set of cluster counters 210A, . . . , 210N. The initialization vector determination instructions 121, when executed by processor 110, may initialize the group counters and counters associated with each cache line as well in a manner the same as or similar to that described above in this example and may re-encrypt each cache line in the page.

The system 100 may perform this functionality each time data is requested, stored, and/or otherwise handled.

Figure 3:
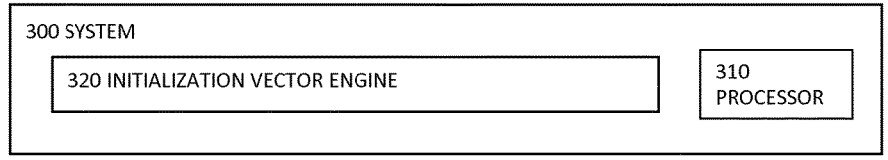
FIG. 3 is a block diagram of an example system for efficient storage of initialization vectors.

FIG. 3 is a block diagram of an example system 300 for efficient storage of initialization vectors. As with system 100, system 300 may comprise a server, a mainframe, notebook, desktop, tablet, workstation, mobile device, a cloud-based device, and/or any other device suitable for executing the functionality described below. As with processor 110 of FIG. 1, processor 310 may be one or more CPUs, microprocessors, and/or other hardware devices suitable for retrieval and execution of instructions. The non-transitory machine readable storage of FIG. 3 may be the same as or similar to the storage medium 120 of FIG. 1. Non-transitory machine-readable storage medium of FIG. 3 may store information related to the initialization vectors associated with each page of memory in the non-transitory machine-readable storage medium. In some examples, the information stored by non-transitory machine-readable storage medium may be the same as or similar to information stored by non-transitory machine-readable storage medium 120

As detailed below, system 300 may include a series of engines 320 for efficient storage of initialization vectors. Each of the engines may generally represent any combination of hardware and programming. For example, the programming for the engines may be processor executable instructions stored on a non-transitory machine-readable storage medium and the hardware for the engines may include at least one processor of the system 300 to execute those instructions. In addition or as an alternative, each engine may include one or more hardware devices including electronic circuitry for implementing the functionality described below.

Initialization vector determination engine 320 may facilitate efficient storage of initialization vectors for system 300. For example, in a system 300 that uses 3 levels of counters in its hierarchy of counters (e.g., a cache-level counter, a group counter associated with a first group of cache lines, and a cluster counter associated with a set of grouped cache lines), initialization vector determination engine 320 may determine an initialization vector for use in encrypting a first cache line of a first page of memory. Initialization vector determination engine 320 may determine the initialization vector by concatenating a page-level counter with a first set of hierarchical counters associated with the first cache line. The first set of hierarchical counters may include, for example, a first counter associated with the first cache line, a first group counter associated with a first group of cache lines, where the first group of cache lines includes the first cache line, and a first cluster counter associated with a first cluster of cache line groups, where the first cluster includes the first group of cache lines. In some examples, the first set of hierarchical counters may include a counter associated with the first cache line at each level of hierarchical counters.

In some examples, the initialization vector determination engine 320 may facilitate efficient storage of initialization vectors in a manner the same as or similar to that of the initialization vector determination instructions 121 of system 100, Further details regarding an example implementation of initialization vector determination engine 320 are provided above in connection with initialization vector determination instructions 121 of FIG. 1.

Figure 4:
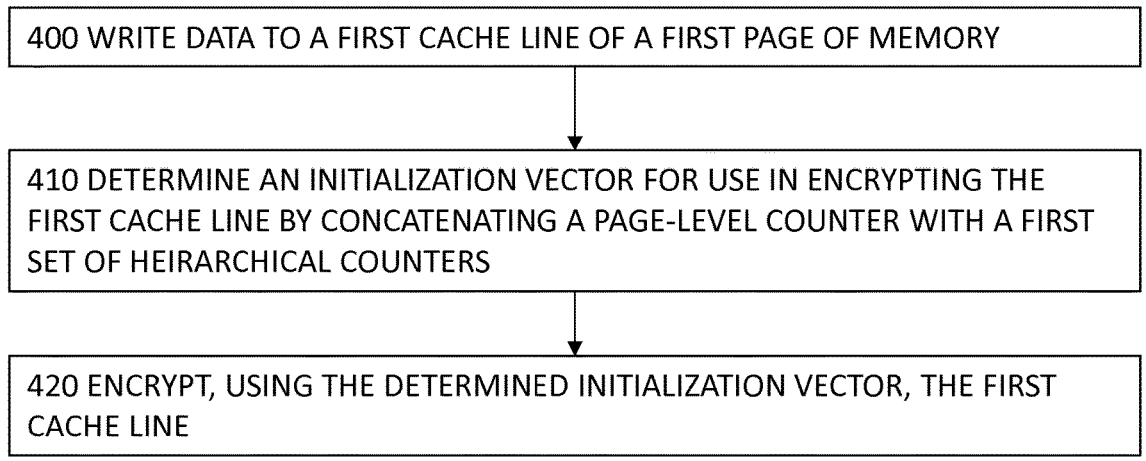
FIG. 4 is a flowchart of an example method for efficient storage of initialization vectors.

FIG. 4 is a flowchart of an example method for execution by a computing device for efficient storage of initialization vectors.

Although execution of the methods described below are with reference to system 100 of FIG. 1, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, data may be written to a first cache line of a first page of memory. For example, the system 100 (and/or the initialization vector determination instructions 121, the initialization vector determination engine 320, or other resource of the system 100) may write data to the first cache line. The system 100 may write data to the first cache line in a manner similar or the same as that described above in relation to the execution of the initialization vector determination instructions 121, the initialization vector determination engine 320, and/or other resource of the system 100.

In an operation 410, an initialization vector may be determined for use in encrypting the first cache line, where the initialization vector may be determined by concatenating a page-level counter with a first set of hierarchical counters. For example, the system 100 (and/or the initialization vector determination instructions 121, the initialization vector determination engine 320, or other resource of the system 100) may determine the initialization vector. The system 100 may determine the initialization vector in a manner similar or the same as that described above in relation to the execution of the initialization vector determination instructions 121, the initialization vector determination engine 320, or other resource of the system 100.

In an operation 420, the first cache line may be encrypted using the determined initialization vector. For example, the system 100 (and/or the initialization vector determination instructions 121, the initialization vector determination engine 320, or other resource of the system 100) may encrypt the first cache line. The system 100 may encrypt the first cache line in a manner similar or the same as that described above in relation to the execution of the initialization vector determination instructions 121, the initialization vector determination engine 320, or other resource of the system 100.

Figure 5:
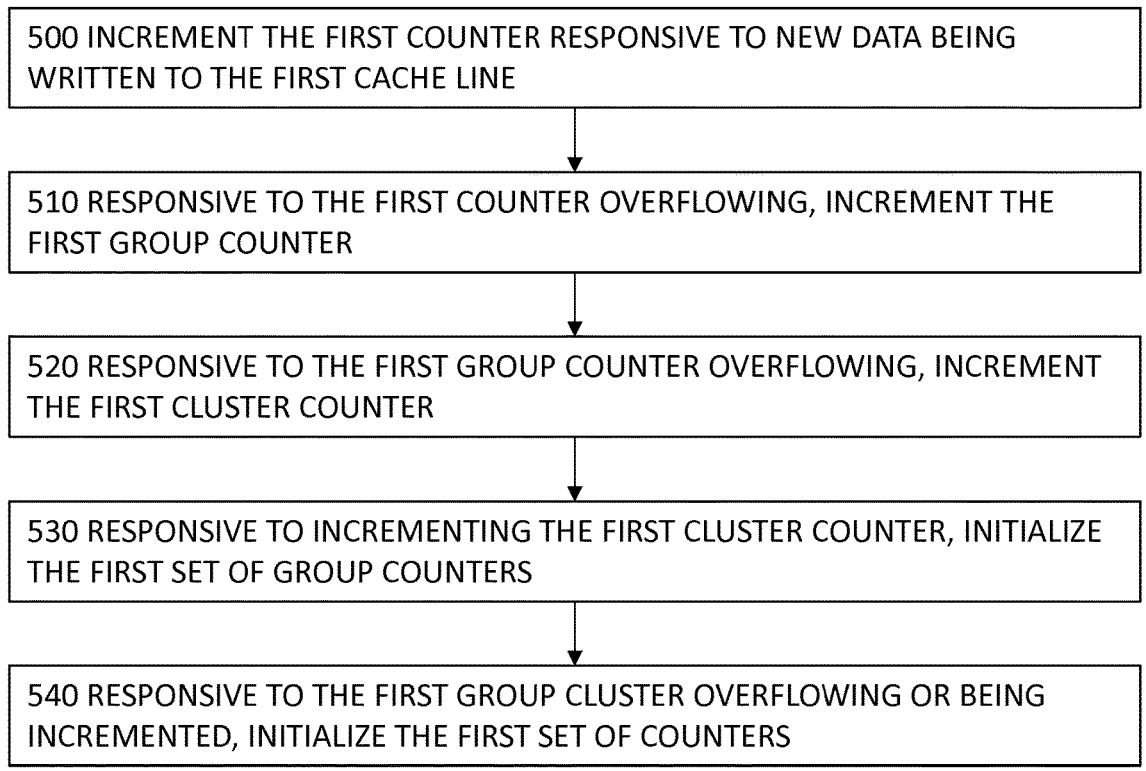
FIG. 5 is a flowchart of an example method for efficient storage of initialization vectors.

FIG. 5 is a flowchart of an example method for execution by a computing device for efficient storage of initialization vectors.

In an operation 500, a first counter may be incremented responsive to new data being written to the first cache line. For example, the system 100 (and/or the initialization vector determination instructions 121, the initialization vector determination engine 320, or other resource of the system 100) may increment the first counter. The system 100 may increment the first counter in a manner similar or the same as that described above in relation to the execution of the initialization vector determination instructions 121, the initialization vector determination engine 320, and/or other resource of the system 100.

In an operation 510, the first group counter may be incremented responsive to the first counter overflowing. For example, the system 100 (and/or initialization vector determination instructions 121, the initialization vector determination engine 320, or other resource of the system 300) may increment the first group counter. The system 100 may increment the first group counter in a manner similar or the same as that described above in relation to the execution of the initialization vector determination instructions 121, the initialization vector determination engine 320, or other resource of the system 300.

In an operation 520, the first cluster counter may be incremented responsive to the first group counter overflowing. For example, the system 100 (and/or initialization vector determination instructions 121, the initialization vector determination engine 320, or other resource of the system 300) may increment the first cluster counter. The system 100 may increment the first cluster counter in a manner similar or the same as that described above in relation to the execution of the initialization vector determination instructions 121, the initialization vector determination engine 320, or other resource of the system 300.

In an operation 530, the first set of group counters may be initialized responsive to incrementing the first cluster counter. For example, the system 100 (and/or initialization vector determination instructions 121, the initialization vector determination engine 320, or other resource of the system 300) may initialize the first set of group counters. The system 100 may initialize the first set of group counters in a manner similar or the same as that described above in relation to the execution of the initialization vector determination instructions 121, the initialization vector determination engine 320, or other resource of the system 300.

In an operation 540, the first set of cache line counters may be initialized responsive to the first group counter being incremented or overflowing. For example, the system 100

(and/or initialization vector determination instructions 121, the initialization vector determination engine 320, or other resource of the system 300) may initialize the first set of cache line counters. The system 100 may initialize the first set of cache line counters in a manner similar or the same as that described above in relation to the execution of the initialization vector determination instructions 121, the initialization vector determination engine 320, or other resource of the system 300.

The foregoing disclosure describes a number of example embodiments for efficient storage of initialization vectors. The disclosed examples may include systems, devices, computer-readable storage media, and methods for efficient storage of initialization vectors. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A method for efficiently storing initialization vectors in a system comprising a physical processor implementing computer readable instructions, the method comprising:
    writing data to a first cache line of a first page of memory;
    determining an initialization vector for use in encrypting the first cache line;
    encrypting, using the determined initialization vector, the first cache line,
    wherein determining the initialization vector comprises:
        concatenating a page-level counter with a first set of hierarchical counters, the first set of hierarchical counters including:
        a first counter associated with the first cache line;
        a first group counter associated with a first group of cache lines, the first group of cache lines comprising the first cache line; and
        a first cluster counter associated with a first cluster of cache line groups, the first cluster comprising the first group of cache lines.

2. The method of claim 1, wherein each cache line of the first page is associated with a corresponding counter, a corresponding group counter associated with a corresponding group that includes the cache line, and a corresponding cluster counter associated with a corresponding cluster that comprises the corresponding group.

3. The method of claim 1, further comprising:
    incrementing the first counter responsive to new data being written to the first cache line;
    responsive to the first counter overflowing, incrementing the first group counter; and
    initializing the first set of hierarchical counters associated with the first group counter.

4. The method of claim 3, further comprising
    incrementing the first cluster counter responsive to the first group counter overflowing; and
    initializing a first set of group counters associated with the first cluster counter; and
    responsive to initializing the first group counter, initializing the first set of hierarchical counters associated with the first group counter.

5. The method of claim 4, further comprising:
    initializing the first set of hierarchical counters associated with the first group counter responsive to initializing the first group counter.

6. The method of claim 5, further comprising
    responsive to writing second data to the first cache line, determining a second initialization vector for encrypting the second data of the first cache line by:
        concatenating the incremented first cluster counter, the first group counter, and the first counter.

7. A system for efficiently storing of initialization vectors, the system comprising:
    a physical processor implementing machine readable instructions stored on a non-transitory machine-readable storage medium that cause the system to:
        determine an initialization vector for use in encrypting a first cache line of a first page of memory, wherein determining the initialization vector comprises:
            concatenating a page-level counter with a first set of hierarchical counters, the first set of hierarchical counters including:
            a first counter associated with the first cache line;
            a first group counter associated with a first group of cache lines, the first group of cache lines comprising the first cache line; and
            a first cluster counter associated with a first cluster of cache line groups, the first cluster comprising the first group of cache lines.

8. The system of claim 7, wherein each cache line of the first page is associated with a corresponding counter, a corresponding group counter associated with a corresponding group that includes the cache line, and a corresponding cluster counter associated with a corresponding cluster that comprises the corresponding group.

9. The system of claim 7, wherein the physical processor implements machine readable instructions that cause the system to:
    increment the first counter responsive to new data being written to the first cache line;
    update the initialization vector to include the incremented first counter; and
    encrypt, using the updated initialization vector, the first cache line.

10. The system of claim 9, wherein the physical processor implements machine readable instructions that cause the system to:
    increment the first group counter responsive to the first counter overflowing; and
    initialize the first set of hierarchical counters associated with the first group counter.

11. The system of claim 10, wherein the physical processor implements machine readable instructions that cause the system to:
    increment the first cluster counter responsive to the first group counter overflowing; and
    initialize a first set of group counters associated with the first cluster counter; and responsive to initializing the first group counter, initialize the first set of hierarchical counters associated with the first group counter.

12. The system of claim 11, wherein the physical processor implements machine readable instructions that cause the system to:
   initialize the first set of hierarchical counters associated with the first group counter responsive to initializing the first group counter.

13. The system of claim 12, wherein the physical processor implements machine readable instructions that cause the system to:
   responsive to writing second data to the first cache line, determining a second initialization vector for encrypting the second data of the first cache line by:
      concatenating the incremented first cluster counter, the first group counter, and the first counter.

14. A non-transitory machine-readable storage medium comprising instructions for efficiently storing initialization vectors, the instructions executable by a physical processer of a system to:
   for each cache line of a page of memory, determine a corresponding initialization vector for use in encrypting the cache line, wherein determining the corresponding initialization vector comprises:
      concatenating a page-level counter with a corresponding set of hierarchical counters, the corresponding set of hierarchical counters including:
         a corresponding counter associated with the corresponding cache line;
         a corresponding group counter associated with a corresponding group of cache lines, a first group of cache lines comprising the each corresponding cache line corresponding to the first group; and
         a corresponding cluster counter associated with a corresponding cluster of cache line groups, the corresponding cluster comprising the corresponding group of cache lines.

15. The non-transitory machine-readable storage medium of claim 14, further comprising instructions executable by the physical processor of the system to:
   increment a counter responsive to new data being written to a first corresponding cache line that corresponds to the first group;
   update the initialization vector to include the incremented counter; and
   encrypt, using the updated initialization vector, the first corresponding cache line.

* * * * *